(12) United States Patent
Norieda

(10) Patent No.: US 8,743,079 B2
(45) Date of Patent: Jun. 3, 2014

(54) POSITION INFORMATION INPUT DEVICE AND POSITION INFORMATION INPUT METHOD

(75) Inventor: Shin Norieda, Tokyo (JP)

(73) Assignee: NEC Corporation, Tokyo (JP)

( * ) Notice: Subject to any disclaimer, the term of this patent is extended or adjusted under 35 U.S.C. 154(b) by 416 days.

(21) Appl. No.: 13/000,859

(22) PCT Filed: Jun. 25, 2009

(86) PCT No.: PCT/JP2009/061604
§ 371 (c)(1),
(2), (4) Date: Dec. 22, 2010

(87) PCT Pub. No.: WO2010/024028
PCT Pub. Date: Mar. 4, 2010

(65) Prior Publication Data
US 2011/0134074 A1 Jun. 9, 2011

(30) Foreign Application Priority Data
Aug. 29, 2008 (JP) .................................. 2008-222934

(51) Int. Cl.
*G06F 3/045* (2006.01)
*G06F 3/041* (2006.01)
*G09G 5/00* (2006.01)

(52) U.S. Cl.
USPC .......................... 345/174; 345/156; 345/173

(58) Field of Classification Search
USPC ......................................... 345/156, 173, 174
See application file for complete search history.

(56) References Cited

U.S. PATENT DOCUMENTS 4,120,294 A * 10/1978 Wolfe ............................ 600/519
4,591,854 A * 5/1986 Robinson ...................... 340/5.65
5,016,213 A * 5/1991 Dilts et al. ...................... 463/36
5,617,477 A * 4/1997 Boyden ......................... 381/309
6,950,695 B2 * 9/2005 Chen .............................. 600/509
6,991,364 B2 * 1/2006 Yang .............................. 368/281
7,020,508 B2 * 3/2006 Stivoric et al. ................ 600/390

(Continued)

FOREIGN PATENT DOCUMENTS

| JP | 2004199145 A | 7/2004 |
| JP | 2004537802 A | 12/2004 |

(Continued)

OTHER PUBLICATIONS

International Search Report for PCT/JP2009/061604 mailed Oct. 13, 2009.

*Primary Examiner* — Bipin Shalwala
*Assistant Examiner* — Benyam Ketema
(74) *Attorney, Agent, or Firm* — Sughrue Mion, PLLC

(57) ABSTRACT

A position information input device is provided with input positions assumed to be some positions of the surface of a conductive object, one or more signal receiving electrodes provided in other positions on the conductive object correspondingly thereto, for receiving a positioning signal inputted to each input position, and a signal input transfer module for transferring the same positioning signal specific to the input position. A signal generation/output module is provided together with the signal input transfer module, for generating the positioning signal in which a plurality of signals having different frequencies are defined as one group. The position information input device calculates path resistance values between the input position and the signal receiving electrodes from the respective values of the positioning signals received by the signal receiving electrodes and specifies the input position from the differences thereof.

17 Claims, 15 Drawing Sheets

(56) References Cited

U.S. PATENT DOCUMENTS

| | | | | |
|---|---|---|---|---|
| 7,154,471 | B2* | 12/2006 | Laurell | 345/156 |
| 8,040,758 | B1* | 10/2011 | Dickinson | 368/11 |
| 2004/0032346 | A1* | 2/2004 | Kim et al. | 341/20 |
| 2008/0072691 | A1* | 3/2008 | Gruber | 73/865.4 |
| 2008/0167535 | A1* | 7/2008 | Stivoric et al. | 600/301 |
| 2010/0220054 | A1* | 9/2010 | Noda et al. | 345/156 |
| 2010/0265170 | A1* | 10/2010 | Norieda | 345/156 |
| 2011/0134063 | A1* | 6/2011 | Norieda | 345/173 |
| 2011/0134082 | A1* | 6/2011 | Mitsuhashi et al. | 345/177 |

FOREIGN PATENT DOCUMENTS

| | | | | |
|---|---|---|---|---|
| JP | 2005258734 A | | 9/2005 | |
| JP | 2005301874 A | | 10/2005 | |
| JP | 2006-127190 | * | 5/2006 | G06F 3/044 |
| JP | 2006-133932 | * | 5/2006 | G06F 3/041 |
| JP | 2006127190 A | | 5/2006 | |
| JP | 2006133932 | * | 5/2006 | G06F 3/041 |
| JP | 2006133932 A | | 5/2006 | |
| WO | 2010024029 A | | 3/2010 | |
| WO | 2010024030 A | | 3/2010 | |
| WO | 2010024031 A | | 3/2010 | |

* cited by examiner

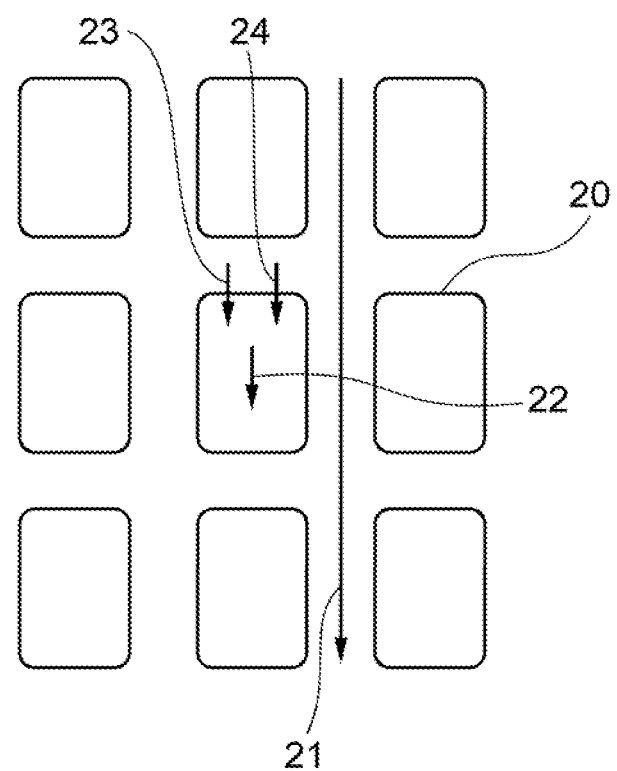

POSITION INFORMATION INPUT DEVICE AND POSITION INFORMATION INPUT METHOD

This Application is the National Phase of PCT/JP2009/061604, filed Jun. 25, 2009, which claims the Priority right based on Japanese Patent Application No. 2008-222934 filed on Aug. 29, 2008 and the disclosure thereof is hereby incorporated by reference in its entirety.

TECHNICAL FIELD

The present invention relates to a position information input device and the like. More specifically, the present invention relates to a position information input device and a position information input method, which can be applied to portable apparatuses such as mobile telephones, PDAs or notebook personal computers, etc.

BACKGROUND ART

For input devices of mobile apparatuses placing more importance on the portability and mobile apparatuses placing more importance on display unit such as displays, an input device with a small input unit on the apparatus is desired.

As a method for reducing the layout space of keys of the input unit on the apparatus, there may be a technical method which allots a plurality of functions to a single input. As a related technique of such method, there is a method which places a joystick for detecting tilt angles of top and bottom as well as right and left directions on the apparatus, and switches characters according to the tilt directions (Patent Document 1).

However, with such method, the tilt directions of the joystick for inputting each character are different from the input method of the mobile apparatuses. Thus, a skill for input is required, and input operations in most cases become complicated. Thus, input errors including operation errors occur frequently.

Further, there is also a method which separates a detecting unit as the above-described input unit from the apparatus main body, and places it independently. As an example of a related technique of that kind, there is a method which performs input actions by wearing the detecting unit on the body (Patent Document 2).

However, it is necessary with such method to prepare the input unit separately from the apparatus, so that the portability thereof becomes poor. Further, it is a troublesome work that the operator needs to wear the detecting unit.

Furthermore, as a method for reducing the space of the input unit for detecting actions to the face of the apparatus, there is a method which performs handwriting character input by detecting digital compressions in the X, Y, and Z axis directions. As a related technique of that kind, there is a method which uses track points, and performs handwriting character input from the digital compression change pattern thereof (Patent Document 3).

However, with such method, there is no transposition of the fingertip that performs input actions. Thus, it is difficult to check the actions, so that input errors may be caused thereby.
Patent Document 1: Japanese Unexamined Patent Publication 2005-258734
Patent Document 2: Japanese Unexamined Patent Publication 2004-537802
Patent Document 3: Japanese Unexamined Patent Publication 2005-301874

DISCLOSURE OF THE INVENTION

Problems to be Solved by the Invention

With the above-described related techniques, there are more inconveniences as described hereinafter.

First of all, the first issue is that a skill is required for input actions in a case where a plurality of functions are allotted to a small input area when performing operations such as selecting and finalizing operations in a small input area.

This is because it is required to get accustomed to the input actions since input operations of a complicated operation system are required for allotting the plurality of function to the small input area and since input operations different from character input operations by numeric keys used often with mobile telephones are required.

Next, the second issue is that more input errors are to occur with the operations of selecting and finalizing actions done via the small input area. Since the pitch of the input area is narrow, high positioning accuracy is required when an operator performs input actions. Thus, the number of input errors is increased, and it takes time for set positions in most cases.

Further, the third issues is that a large input area is required for operations such as handwriting character input. This is because it is necessary to execute operations with scrolling actions and to designate the input start position as an absolute position in a case of the input operations such as the handwriting character input, a large input area is required since.

Furthermore, the fourth issue is that there is a troublesome work to prepare the detecting unit separately from the apparatus. To wear only the detecting unit to the operator's body causes an encumbrance when no input operation is to be performed, and it is a troublesome work to detach and wear the detecting unit. Further, in a case of input executed through performing an input operation to the body by wearing the detecting unit to the body, the input unit is required separately from the apparatus. Thus, it is not excellent in terms of the portability.

It is an object of the present invention to improve the inconveniences of the above-described related techniques. More specifically, the object of the present invention is to provide a position information input device and a position information input method, which are capable of effectively securing the state of the input device that is easily handled by an operator even when it is the input device of a mobile apparatus that places more importance on the portability or a mobile apparatus that places more importance on a display unit such as a display, in which an input area on the apparatus cannot be secured wide.

Means for Solving the Problems

In order to achieve the foregoing object, the position information input device according to the present invention is characterized to include at least: an input unit formed with a single or a plurality of signal transmitting units for dispatching an electric signal when being in contact with a body that holds a terminal for making an input and a plurality of signal receiving units for detecting the electric signal and outputting detection data; a dispatch/generation module which generates the electric signal for the signal transmitting unit(s), outputs the generated signal as dispatch data, and outputs output chronic timing thereof and a state of the generated signal as generation data; and an input information specifying module which specifies a contact position by referring to the detection data, the generation data, and accumulation data in a database set in advance, and outputs the position as input information specification data.

In order to achieve the foregoing object, the position information input method according to the present invention is characterized to include at least: a dispatch/generation step which generates an electric signal, outputs the generated signal as dispatch data, and outputs output chronic timing thereof and a state of the generated signal as generation data; a signal transmitting step for dispatching the electric signal when there is a contact with a body that holds a terminal for making an input; a signal receiving step for detecting the electric signal and outputting detection data; and an input information specifying step which specifies a contact position by referring to the detection data, the generation data, and accumulation data in a database set in advance, and outputs the position as input information specification data.

Effect of the Invention

As described above, the present invention includes at least: an input unit formed with a single or a plurality of signal transmitting units for dispatching an electric signal when being in contact with a body that holds a terminal for making an input and a plurality of signal receiving units for detecting the electric signal and outputting detection data; a dispatch/generation module which generates the electric signal for the signal transmitting unit(s), outputs the generated signal as dispatch data, and outputs output chronic timing thereof and a state of the generated signal as generation data; and an input information specifying module which specifies a contact position by referring to the detection data, the generation data, and accumulation data in a database set in advance, and outputs the position as input information specification data. Thus, when there is a contact with the body that holds the terminal for making an input, an electric signal is dispatched from the terminal that is in contact with the human body, and the electric signal transmitted inside the human body is detected to measure the physical electric property, thereby making it possible to specify the input contact position. Thus, it is possible to allot an imaginary input area for performing input operations in a part of the human body that comes in contact with the terminal, so that the detecting unit on the apparatus can be made small and the display unit can be secured large. Further, it is possible to secure the large input area allotted to the human body.

Further, another effect is that the operations such as selecting and finalizing operations can be easily understood since the input area is large. The operations can be easily done since each function can be allotted to the larger input area compared to the known cases which allot a plurality of functions to a single input area for reducing the input area and select each function by the operation order and combinations.

Furthermore, still another effect is that the operations such as selecting and finalizing operations can be done easily since the input area is large. It is possible to secure a sufficiently larger input area compared to the case where the input area is provided on the apparatus and the size thereof is reduced as in the case of another related technique. Thus, the operator can easily set the positions for input operations, thereby providing the effect of reducing input errors and cutting the input time.

Further, the present invention secures the large input area, so that it is suited for operations such as the handwriting character input. For example, compared to the case of loading a device that performs pointing or scroll operations by contacting the surface to each apparatus to reduce the size thereof, the present invention is capable of securing the large input area for performing the input even though the detecting unit (receiving electrode) for detecting the input is small. Therefore, it is suited for operations with scroll actions, which require a large operation area, and for operations which designate the input start position as an absolute position.

Furthermore, the present invention exhibits a high input validating property, since it is possible to sense that there is an input operation being performed by feeling a touch to the body. Thus, the present invention is capable of providing the excellent position information input device and position information method, with which it is possible to check which of the positions an input is made without looking at the operation part.

BRIEF DESCRIPTION OF THE DRAWINGS

FIGS. 4A and 4B show illustrations showing the structural contents of the input unit of the first exemplary embodiment disclosed in FIG. 3, in which FIG. 4A is an explanatory illustration showing an example of shapes and layout of each structural element of the input unit and FIG. 4B is a schematic sectional view showing an example of shapes and layout of each structural element of the input unit;

FIGS. 7A and 7B are flowcharts showing a content regarding a positioning signal outputted from a signal generating/outputting module of the first exemplary embodiment disclosed in FIG. 1, in which FIG. 7A is an explanatory illustration showing the state of changes in the frequency of the given positioning signal and FIG. 7B shows a signal processing state (action of a main control unit which operation-controls the input position specifying module) for specifying the input position based on the given positioning signal after being detected by a plurality of receiving electrodes;

FIG. 8 is an explanatory chart showing human cells including the back of the hand of the human body disclosed in FIG. 3 and the electric property thereof;

FIGS. 9A and 9B show illustrations of electrical equivalent circuits of the human cells shown in FIG. 8, in which FIG. 9A shows a typical equivalent circuit and FIG. 9B is a simple equivalent circuit of FIG. 9A;

FIGS. 11A, 11B, and 11C show illustrations regarding relations between contact positions and electric resistance values according to the content of the example disclosed in FIG. 3, in which FIG. 11A is a case where the path resistance is a relatively small value $R_1$, FIG. 11B is a case where the path resistance is about a medium value $R_2$, and FIG. 11C is a case where the path resistance is a relatively large value $R_3$.

FIGS. 14A and 14B are examples of the second exemplary embodiment shown in FIG. 13 illustrating the state of each structural element and the layout thereof, in which FIG. 14A is an explanatory illustration of the layout of each structural element (mainly the relation of input and output electrodes) and FIG. 14B is a circuit diagram showing the wiring relation of FIG. 14A.

Figure 1:
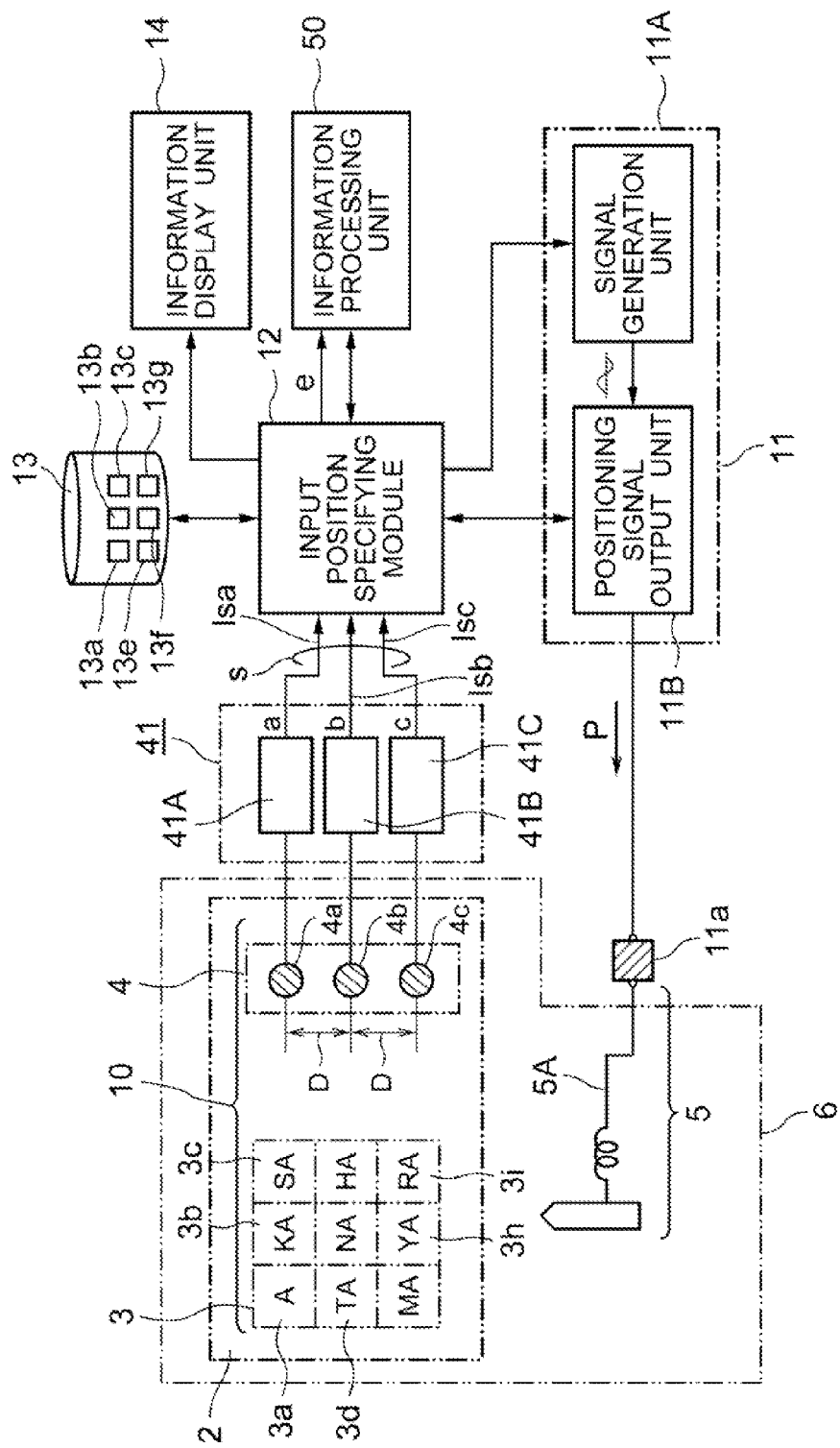
FIG. 1 is a block diagram showing the structure of a first exemplary embodiment of the invention.

BEST MODES FOR CARRYING OUT THE INVENTION (First Exemplary Embodiment)

Hereinafter, a first exemplary embodiment of the invention will be described by referring to FIG. 1 to FIG. 12.

In the first exemplary embodiment, the basic structural contents will be described first, and specific contents will be described thereafter.

First, a position information input device (terminal) 1 according to the first exemplary embodiment includes at least: an input unit configured with a single or a plurality of signal transmitting units which dispatch an electric signal when making a contact with the body that holds a terminal for input and a plurality of signal receiving units which detect the electric signal and output detection data; a dispatch/generation module which generates the electric signal and outputs the electric signal as dispatch data, and outputs chronic timing of the output as well as the state of the generated signal as generation data to the signal transmitting units; and an input information specifying module which specifies a contact position by referring to the detection data, the generation data, and accumulation data of a database set in advance, and outputs the position as input information specification data.

The signal transmitting units and the signal receiving units are disposed to be in contact with a part of the body such as the hand that holds the terminal and the fingertip or the base of the finger, and have a function of detecting the transmitted electric signals dispatched from the signal transmitting units based on the physical electric property such as the bone structure, muscles, tendons, joints, skin, and the like of the body by the signal receiving unit by electric current values and voltage values.

Further, the above-described input unit is structured to include: a conductive electrode pad at a part that comes in contact with a part of the body as the signal transmitting units and the signal receiving unit; and a casing formed by an insulator for blocking electrical connections made at the other parts.

The casing of the input unit described above is in a wristwatch shape, in which the signal transmitting unit of the input unit is disposed on the top face side of the casing, and three signal receiving units of the input unit described above are disposed on the back face side of the casing. Further, the signal transmitting unit and the signal receiving unit are disposed at a position to be in contact with the body on the terminal surface of the casing, and the signal transmitting units and the signal receiving units are disposed at the three points of the back face side of the terminal of the casing to be contact with the body.

In the meantime, the signal transmitting units may be disposed on the top surface of the casing, and two signal receiving units described above may be disposed on the back face of the casing.

Further, the dispatch/generation module described above is structured to generate electric signals to be alternating currents as the electric signals dispatched from the signal transmitting units, and to output the signals in order in a specific time unit from a lower frequency to a higher frequency.

Further, the input information specifying module described above is structured to: calculate the electric impedance properties from the electric current values and the voltage values as the detection data based on the timing showing each frequency as the generation data; calculate only the electric impedance to be a target based on the physical electric property such as the bones, muscles, tendons, joints, skin, blood and the like of the body by referring to the accumulation data in the database set in advance; and specify the contact position from the electric impedance.

Furthermore, for specifying the contact position from the electric impedance, the input information specifying module has an arithmetic operation function which calculates model fitting with respect to the impedance property by the electric equivalent circuit based on the cells of the body in particular, and specifies the contact position by calculating the electric pure resistance power of the body.

In the database described above, the electric resistance of the body that performs input operations and the contact resistance at the contact part are recorded as the accumulation data. Further, in addition to the electric resistance of the body that performs input operations and the contact resistance at the contact part recorded as the accumulation data, the relation between the electric pure resistance power of the body and the length of the body is recorded in the database in advance.

Regarding the basic structural contents of the first exemplary embodiment described above, each function and structural contents thereof are the same as those of a specific example described later in terms of the points below.

That is, in the basic contents, the signal transmitting unit showing the input unit corresponds to an output electrode 11a of FIG. 1, and the signal receiving units correspond to each of receiving electrodes 4a, 4b, and 4c of a signal detecting unit 4 shown in FIG. 1. Further, the dispatch generation module corresponds to a signal generation/output module 11 shown in FIG. 1 and FIG. 2. The conductive electrode pad functions as the signal transmitting unit or the signal receiving unit shown in FIG. 1, and the conductive pads correspond to the output electrode 11a and each of the receiving electrodes 4a, 4b, 4c disclosed in FIG. 1, respectively.

Further, the casing formed with the insulator corresponds to a terminal main body 20 shown in FIG. 4. Further, the database corresponds to a database 13 disclosed in FIG. 1 and FIG. 2.

Based on the corresponding relation described above, the first exemplary embodiment to which the basic structure described above is employed will be described hereinafter in details.

As shown in FIG. 1, the position information input device 1 according to the first exemplary embodiment includes a position signal input module 6 that is formed with: the information input area (input area) 3 having a plurality of input positions 3a, 3b, 3c, - - - , 3i provided in advance in an imaginary assumed matrix form on the surface of a conductive object 2; the signal detecting unit 4 assumed in advance on the conductive object 2, which includes three receiving electrodes 4a, 4b, and 4c located at other positions by corresponding to the input information area 3 for receiving positioning signals inputted at positions corresponding to each of the input positions 3a to 3i; and a signal input transfer module 5 which inserts a specified same positioning signal P by selectively making a touch to the positions corresponding to each of the positions 3a to 3i assumed in the imaginary matrix form. Assured position information of the plurality of input positions 3a, 3b, 3c, - - - , 3i in the imaginary matrix form is to be specified as the position information by an input position specifying module 12 to be described later.

Note here that the conductive object 2 is formed by an object having an electric resistance that allows propagation of electric signals (may be a plate type, a film type, or a part of a human body such as a back of a hand to be described later). The reception signals detected by the signal detecting unit 4 described above after noises thereof are being eliminated in each of receiving circuits 41A, 41B, and 41C of a receiving circuit unit 41 by each reception signal are fed to the input position specifying module 12.

In the signal input transfer module 5, the signal generation/output module 11 which generates and outputs the positioning signal P having a plurality of signals of different frequencies as a group is provided.

Therefore, for inputting the position information of a plurality of each of the input positions 3a to 3i of the input area 3 assumed on the top face of the conductive object 2, the exemplary embodiment is structured to: apply and input the positioning signal P having a plurality of signals of different frequencies keeping same-level voltages as a single group to each of the input positions 3a, - - - , 3h or 3i tinder a same condition; receive the positioning signal P propagated via the conductive object 2 as a positioning signal S by the plurality of receiving electrodes 4a, 4b, and 4c; calculate the resistance value of the propagation path of the positioning signal S by the input position specifying module 12 based on the change in the impedance acquired based on the difference in the frequencies; and specify the above-described input positions 3a, - - - , 3h or 3i based thereupon. Thus, the plurality of each of the input positions 3a, - - - , 3h or 3i of the input area 3 assumed on the conductive object 2 can function as the information input positions only through assuming the input area 3.

Therefore, with the exemplary embodiment, even the back of a hand of a human body as a conductive object can be allotted as the input area 3 for performing input operations without providing any electric wiring, for example. Thus, it is possible to have a small detecting unit on the apparatus (or no area specification) and a large display unit to be used. This makes it possible to secure the large input area 3 anywhere as long as it is the conductive object 2.

Further, while the details are to be described later, the noise of the positioning signals P received by each of the receiving electrodes 4a, 4b, and 4c of the reception signal detecting unit 4 is eliminated by each of the reception circuits 41A, 41B, and 41C as described above, and the reception signals S (practically, reception currents $I_{Sa}$, $I_{Sb}$, and $I_{Sc}$ as will be described later) are fed to the input position specifying module 12.

Further, the input position specifying module 12 calculates the electric resistance values of the path between a given input position out of each of the input positions 3a to 3i and each of the receiving electrodes 4a, 4b, and 4c based on the values of the reception signals S, and specifies and outputs the given input position out of each of the input positions formed in a matrix form based on the calculated electric resistance values.

That is, regarding each of the input positions 3a to 3i of the input area 3 described above, the corresponding input position specifying module 12, the signal generation/output module, and the like can effectively function to specify and input the position information of the input positions 3a to 3i by sectioning/setting only the input area 3 without needing any electric wiring and other structures at all.

The input position specifying module 12 is provided with the database 13 which stores the information inputted to the input position specifying module 12, the information to be the target of processing in the input position specifying module 12, and the processed result thereof, respectively, and also an information display unit 14 for displaying each of those information pieces.

Out of those, each of the input positions 3a to 3i specified by the input position specifying module 12 and external output information specified in advance by corresponding to those are registered in advance to the database 13 by keeping a corresponding relation.

Thus, provided that the calculation of the electric resistance values of the paths described above is accurate, each of the input positions 3a to 3i can be effectively captured and inputted.

Further, the signal generation/output module 11 which generates and outputs the above-described positioning signals P includes: a signal generation unit 11A which generates AC signals with a prescribed frequency as the positioning signals P described above; and a signal generation/output unit 11B which adjusts the AC signals generated by the signal generation unit 11A for the positioning signals P to be outputted.

Figure 7A:
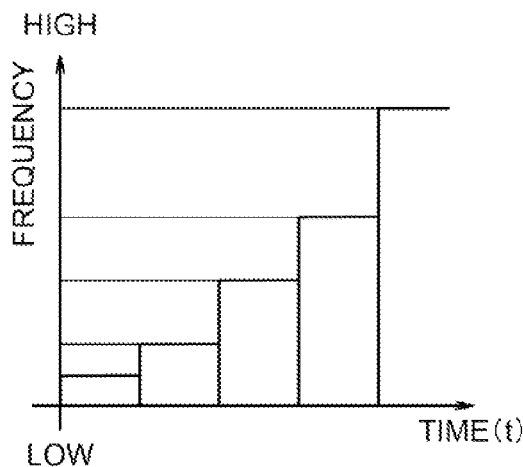

Out of those, the signal generation unit 11A has a function of sequentially generating and outputting a plurality of AC signals of different frequencies for the positioning signals. In this exemplary embodiment, it is structured to be able to generate the AC signals of different frequencies separately in five levels as shown in FIG. 7A and output the signals in a sequentially switching manner by every specific time through being controlled by the input position specifying module 12 described above.

Figure 10:
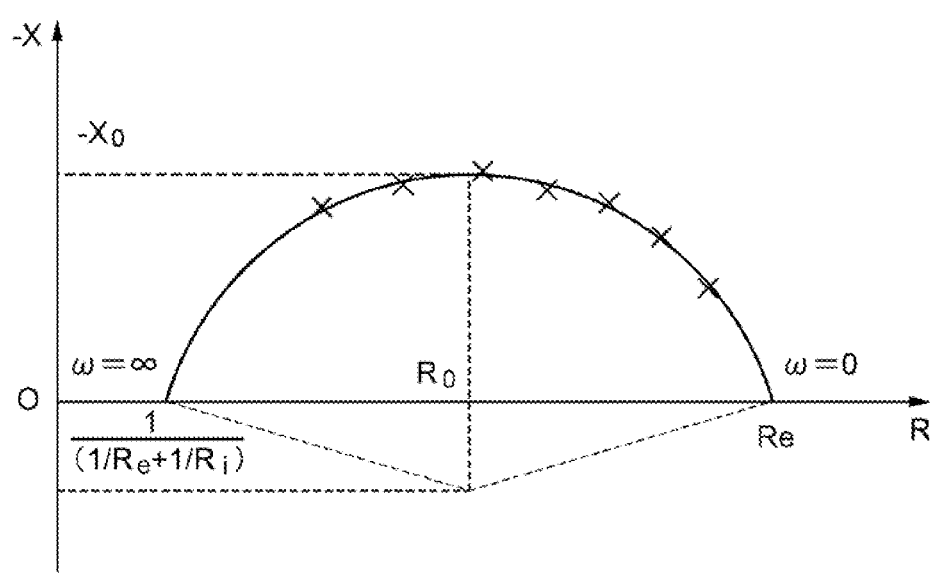
FIG. 10 shows an example of a circle diagram showing an electric impedance at each frequency acquired in FIG. 1 described above.

Therefore, with the first exemplary embodiment, it is possible to acquire functions of five sets of impedances $Z_1$, $Z_2$, $Z_3$, $Z_4$, and $Z_5$ as functions of impedance Z as the position information of a given input position. Based on that, the locus of the impedance Z according to the change in the frequency can be acquired as shown in FIG. 10 to be described later. In FIG. 10, illustrated is a case where the change in the frequency of the given positioning signal P is in seven stages.

Figure 2:
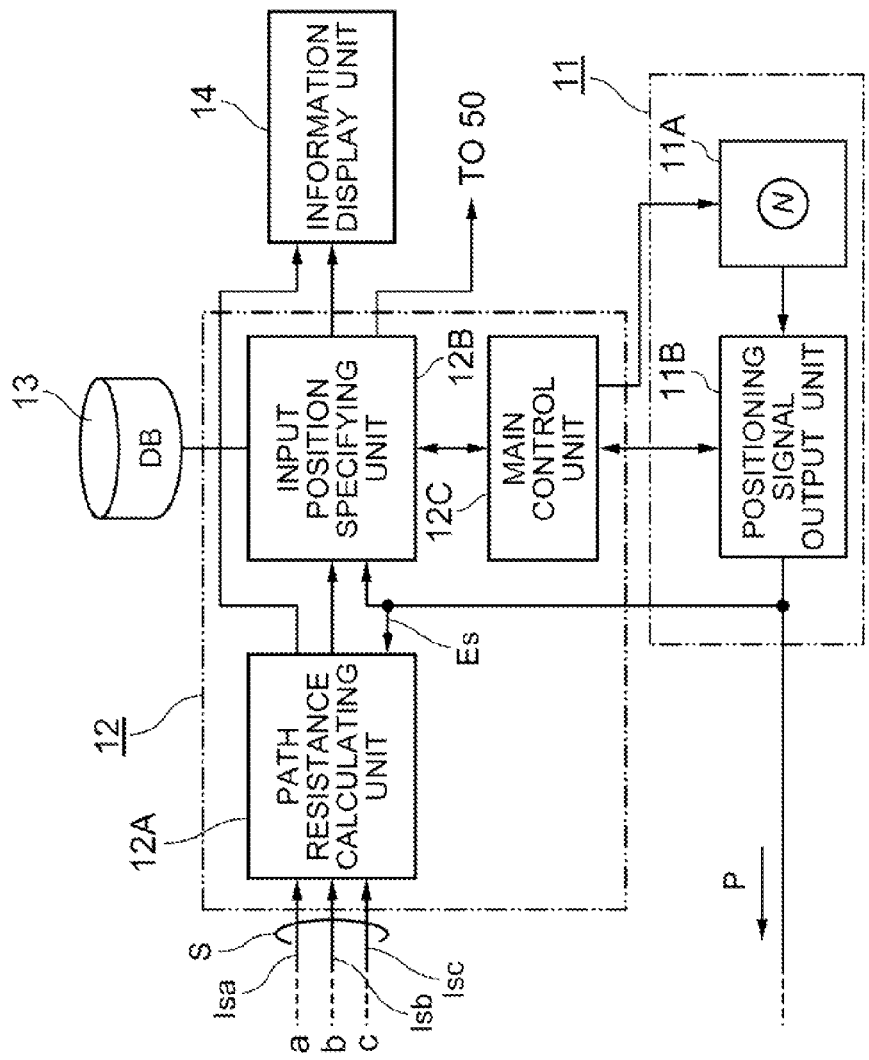
FIG. 2 is a block diagram showing structural contents of an input position specifying module part within the first exemplary embodiment disclosed in FIG. 1.

Further, as shown in FIG. 2, the input position specifying module 12 includes a path resistance calculating unit 12A which calculates, by each frequency, the electric resistance values (path resistance values) of the paths part for allowing the positioning signal P to pass through on the conductive object 2 interposed between each of the input positions 3a to 3i and each of the receiving electrodes 4a, 4b, 4c based on the electric values of a plurality of positioning signals a, b, c with different frequencies received via each of the receiving electrodes 4a, 4b, 4c described above.

Specifically, the input position specifying module 12 is structured by including: the above-described path resistance calculating unit 12A; an input position specifying unit 12B which specifies the input position according to the path resistance values from the plurality of input positions 3a to 3i in a matrix form based on the path resistance value calculated by the path resistance value calculating unit 12A; and a main control unit 12C which controls actions of each of those units (see FIG. 2).

Therefore, each of the structural elements is to function effectively by being controlled by the main control unit 12C as will be described later.

While the details will be described later, the path resistance calculating unit 12A has a function which inputs an output voltage $E_s$ (see FIG. 2) in an output stage of the positioning signal of the signal generation/output module 11 as the positioning signal output unit, and calculates the impedance for each of the frequencies based on the output voltage $E_s$ and reception currents $I_{Sa}$, $I_{Sb}$, $I_{Sc}$ of the plurality of positioning signals with different frequencies received via each of the receiving electrodes 4a to 4c. Further, the path resistance calculating unit 12A has a path resistance specifying function which calculates a pure resistance value of a case where the frequency is zero based on each of the calculated impedances $Z_1$, $Z_2$, $Z_3$, and takes those as the electric resistances (the path resistance values) on propagation paths $L_1$, $L_2$, $L_3$ between each of the input positions 3a to 3i and the receiving electrodes 4a to 4c.

Further, regarding the above-described receiving electrodes 4a, 4b, and 4c, the first exemplary embodiment describes the case where the three receiving electrodes 4a to 4c are provided at a prescribed interval D as shown in FIG. 1.

In this case, a common input position out of the input positions 3a to 3h or 3i according to each path resistance value is specified based on the three different path resistance values calculated by the positioning signals a, b, and c of a same frequency received by each of the three receiving electrodes 4a to 4c. The way specifying the specific input position will be described later.

Further, in a case where two receiving electrodes 4a and 4c described above are loaded at the prescribed interval D (in a case where the receiving electrode 4b of FIG. 1 is eliminated), a common input position according to each path resistance value is specified based on the two different path resistance values calculated according to the positioning signals of a same frequency received by each of the two receiving electrodes 4a and 4c.

Note here that the number of receiving electrodes 4a to 4c may be "1", "2", or "4" or more.

Figure 3:
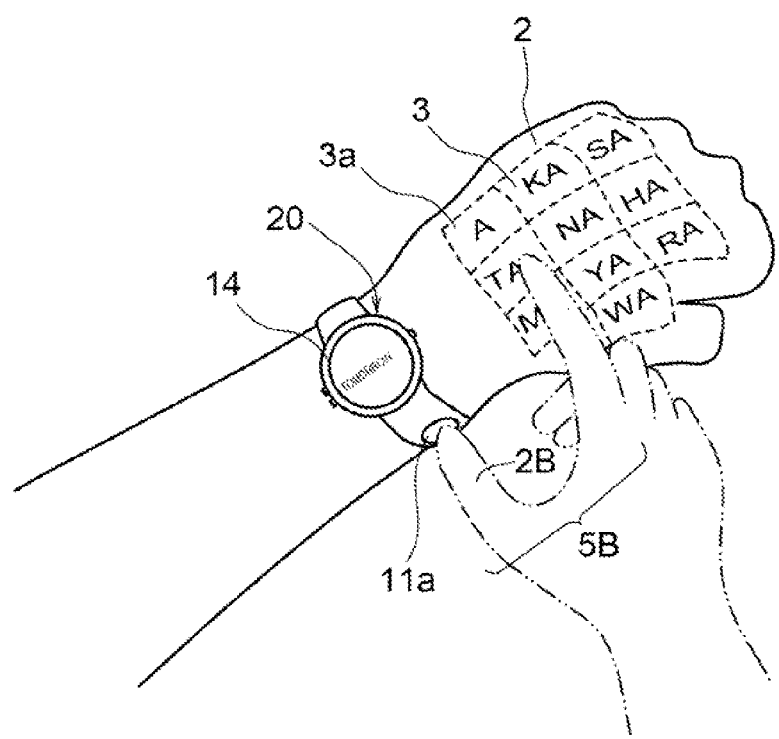
FIG. 3 is an illustration of an example of a case where an input unit of the first exemplary embodiment disclosed in FIG. 1 is placed on the back of a hand of a human body, which shows the use state thereof.

Next, described is a case where the conductive object 2 described above is formed by a part of one of the hands (specifically, a back part 2A of one of the hands of a human body) of a human body (an operator) as shown in FIG. 3.

While a case of using a touch member 5A formed with a conductive member as the above-described signal input transfer module 5 is illustrated-in FIG. 1, a case of forming the touch member 5A by a finger touch input unit 5B including the thumb and forefinger of the other hand of the human body will be described herein.

It is structured to be individually, easily, and quickly insert the positioning signal outputted from the signal generation/output module 11 to each of the input positions 3a to 3i by abutting the finger touch input unit 5B as the signal input transfer module 5 against each of the input positions 3a to 3i of the information input area 3 assumed on a part of one of the hands of the human body.

Furthermore, in the first exemplary embodiment, when setting the use state as shown in FIG. 3, the contact resistance values between the forefinger of the other hand of the human body that configures the above-described signal input transfer module 5 (the finger touch input unit 5B) and each of the input positions 3a to 3i as well as the contact resistance between the output electrode 11a provided in advance to the output stage of the signal generation/output module 11 and the thumb are measured in advance and stored in the above-described database 13.

Further, when calculating the pure resistance in the above-described input position specifying module 12, each of the contact resistance values is subtracted from the calculated pure resistance value, and the result thereof is treated as the electric resistance (the path resistance value).

Further, as described above, in the first exemplary embodiment, the case of forming the conductive object 2 with a part of one of the hands of the human body (the back of the hand 2A part of one of the hands of the human body), and the entire part of another signal processing system including the receiving electrodes 4a to 4c and the input position specifying module 12 is loaded on a bracelet type holding belt 21 as shown in FIG. 4.

Further, the above-described receiving electrodes 4a, 4c are provided on the back face side of the bracelet type holding belt 21 and the receiving electrode 4b is provided on the back face side of the terminal main body to directly abut against the arm of the human body, respectively. At the same time, the output electrode 11a loaded in advance to the output stage of the signal generation/output module 11 is provided in an outer face part on the bracelet type holding belt 21. As described above, the output electrode 11a is for transmitting the output of the signal generation/output module 11 to the signal input transfer module 5.

Next, the contents of the first exemplary embodiment will be described in a more specific manner.

As shown in FIG. 3 described above, the position information input device (referred to as a terminal hereinafter) 1 of the first exemplary embodiment is in contact with a part of the human body by being wrapped around the arm such as a case of a wristwatch. In a state where the thumb of the hand on the input operation side is in contact with a part of the terminal for input, the forefinger is used to make the finger touch input unit 5A come in contact with a part of the body that holds the terminal to conduct an input operation.

Specifically, in the wristwatch type terminal 1 of this exemplary embodiment, an input operation can be done by an action of the forefinger while the thumb is in contact with the output electrode 11a that is a first signal dispatch unit in the belt part as shown in FIG. 3.

As shown in FIG. 1, the position information input device (terminal) 1 is formed with the output electrode 11a for transmitting electric signals and three receiving electrodes 4a to 4c described above for receiving the positioning signals P propagated within the conductive object 2 in order to detect the contact as the input operation, and includes the reception circuit unit 41 which outputs the signal state as the detection data S.

Further, as described above, the position information input device 1 includes: the signal generation/output module 11 which generates an electric AC signal, and outputs it towards the output electrode 11a as the generation/output signal P to which the output chronic timing and the generated signal state are added; and the input position specifying module 12 which, upon receiving the detection data S, refers to the detection data S, the generation data P, and the accumulation data accumulated in the database 13 set in advance by considering the physical electric property such as the bones, muscles, tendons, joints, skin, and the like of the body to specify the contact position and outputs the position as input position information e.

Further, as described above, the position information input device 1 according to the exemplary embodiment is structured by including the information display unit 14 which receives the input position information e, and displays a prescribed symbol, data, and function allotted to that position.

Note here that the input position information e is fed to an information processing unit 50 within the entire information processing system (not shown).

As shown in FIG. 3, on the back of the hand 2A to which the apparatus is wrapped around to be held thereon, the input area (the information input area) 3 for discriminating the input positions is disposed in an imaginary manner. This input area 3 is expressed for discriminating each region, and no member is attached on the surface of the skin. In the input area 3, symbols of consonants from "a" to "wa" in Japanese, which are required for character input are allotted, for example.

In the part where the thumb 2B of the input operation side makes contact with the terminal 1, the output electrode 11a for dispatching the electric signal is disposed. Further, the information display unit 14 for displaying the data and the function based on the inputted information is provided on the surface of the wristwatch type terminal 1 as shown in FIG. 3.

Figure 4A:
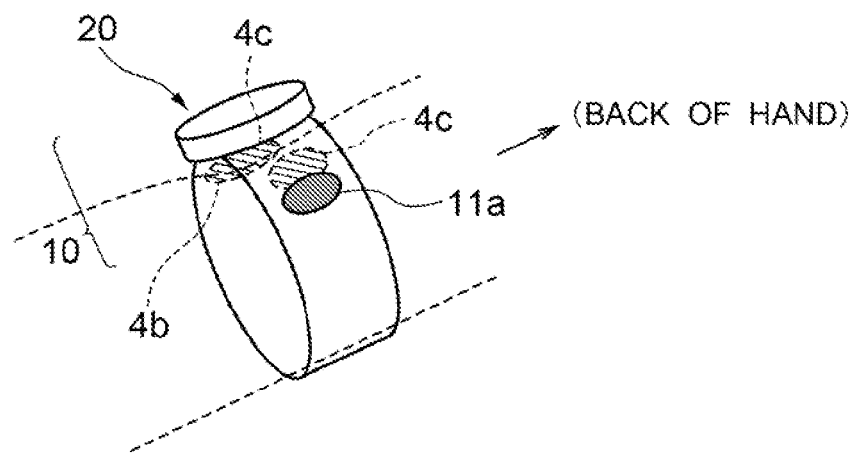

FIG. 4A shows the details of the position information input device (terminal) 1. FIG. 4 shows an input unit 10 transparent on the arm around which the terminal 1 is wrapped, three receiving electrodes 4a, 4b, and 4c for receiving the electric signals are disposed in the part where the back side of the terminal 1 is in contact with the arm face. Further, as described above, the output electrode 11a is disposed on the surface of the terminal 1.

Figure 4B:
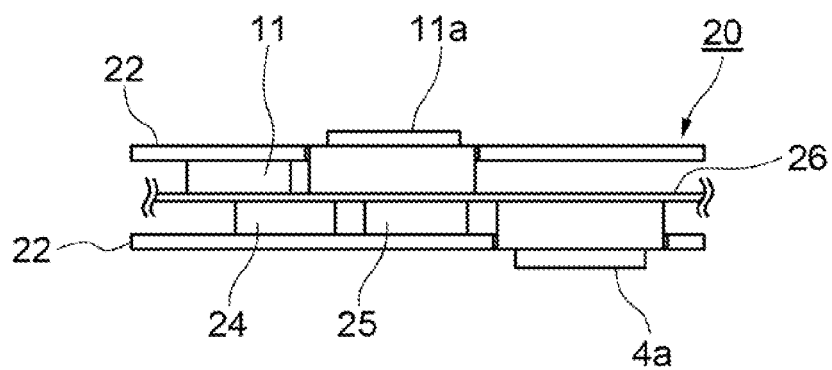

FIG. 4B is a sectional view showing a detailed structure of the input unit 10. FIG. 4B is a sectional view taken along the direction orthogonal to two parts of the arm, and it is a view taken from the back of the hand side. Referring to FIG. 4B, there is the output electrode 11a as an electrode pad through which the fingertip of the operator comes contact with the apparatus. The output electrode 11a as the electrode pad is capable of detecting a weak current by suppressing the contact resistance between the skin and an electrode terminal, e.g., Ag/AgCl electrode, and a type with excellent moisture permeability and elasticity is used by considering the affinity with respect to human bodies.

Further, an insulator 22 that does not let through electric signals to the casing (the terminal main body) 20 part that comes in contact with the operator, the signal generation/output module 11 as the voltage generation circuit that transmits the electric signals to the output electrode 11a as the upper electrode pad, and a voltmeter 24 as well as an ammeter 25 for detecting the voltage values and the electric current values of the reception signals based on the electric signals received at the receiving electrodes 4a, 4b, and 4c are mounted on a wiring board 26.

Figure 5:
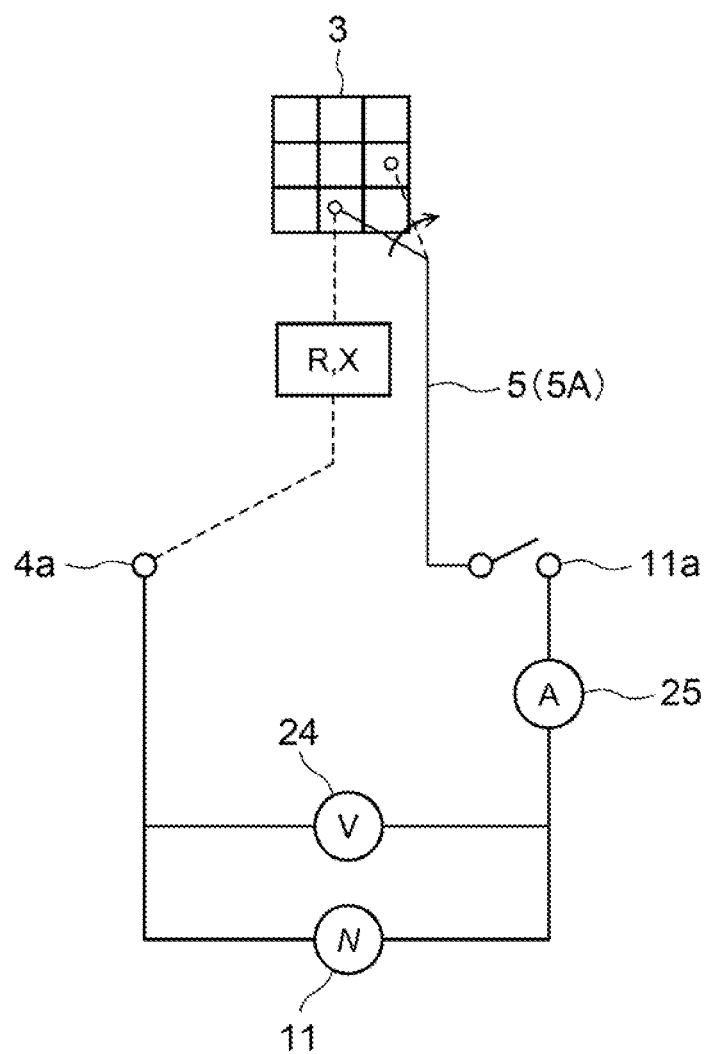
FIG. 5 is an explanatory illustration showing the electrical circuit structure of the input unit of the first exemplary embodiment disclosed in FIG. 3.

FIG. 5 is an electric circuit diagram of the input unit 10. Referring to FIG. 5, the input unit 10 is structured by including: the ammeter 25 for measuring the electric current amount, which is connected in series to the signal output unit 11a as the electrode pad and the receiving electrode 4a as the electrode pad out of the receiving electrodes 4a to 4c; and the voltmeter 24 that is connected in parallel to the signal generation/output module 11 for measuring the voltage applied to the back of the hand of the operator where the signals are propagated through (the output voltage of the signal generation/output module 11 applied between the input position and the receiving electrode).

(Explanations of Actions)

Next, the entire actions and the like of the first exemplary embodiment will be described.

First, the AC electric signal P configured with a same voltage by taking a plurality of signals of different frequencies as a group, which is a specific positioning signal applied to one of the plurality of input positions 3a to 3i of the input area (the information input area) 3 assumed on the surface of the conductive object (the back side of the hand of the human body) 2 via the signal input transfer module 5 (the finger touch input unit 5A) is detected as a positioning signal S by the three detection electrodes 4a to 4c, for example, at other positions on the conductive object 2 (step S11/a positioning signal detecting step: a first step).

Subsequently, the impedances Z (the impedances $Z_1$, $Z_2$, and $Z_3$ of different frequencies) corresponding to the propagation paths $L_1$, $L_2$, and $L_3$ on the conductive object 2 where the detected positioning signal S passes through (see FIG. 12 as an example) are calculated, respectively, by the path resistance calculating unit 12A of the input position specifying module 12 based on the electric current values of the reception signals and the applied voltage values (the same voltages) acquired by each of the receiving electrodes 4a to 4c (step S12/a reception impedance calculating step: a second step).

At the same time, the path resistance calculating unit 12A calculates the pure resistance values R (the path resistance values $R_1$, $R_2$, and $R_3$) of the paths $L_1$ to $L_3$ based on each of the impedances Z ($Z_1$ to $Z_3$) of the propagation paths $L_1$ to $L_3$ of each frequency acquired by the above arithmetic operation (step S13/a path resistance calculating module: a third step).

Further, the input position specifying unit 12B of the input position specifying module 12 described above takes out the position information of the input position (the touched position) corresponding to the calculated path resistance values $R_1$, $R_2$, and $R_3$ from a corresponding list in the database 13 where it is stored in advance as the path resistance values of each input position, and outputs it to the prescribed information processing device 50 along with the corresponding input information (step S14/a position information output step: a fourth step).

As a prestep of the first step (step S11/the positioning signal detecting step) described above, the AC electric signal configured with a same voltage of different frequencies are generated in advance by the signal generation/output module 11 as the positioning signal P, and set to be in a state ready to be outputted at any time, and the signal P is to be outputted towards the output electrode 11a by being controlled by the control unit 12C described above.

Further, in the first step, the conductive object is structured by a part (back of the hand) of one of the hands of the human body, and the input area 3 is assumed on the back of the hand as described above.

Furthermore, regarding the calculation of the pure resistances (the path resistance values $R_1$, $R_2$, and $R_3$) of the paths propagated on the conductive object 2, the above-described third step is structured to calculate a reactance component X and a pure resistance component R of the propagation paths ($L_1$, $L_2$, and $L_3$) on the conductive object according to a plurality of functions of the path impedances Z specified in the prestep and established for each frequency by the input position specifying module 12 provided in advance, and to specify the pure resistance components (the path resistance values $R_1$, $R_2$, and $R_3$) as the electric resistance values.

Hereinafter, the contents of each step as well as the technical environments and the like of the periphery of the signal propagation paths will be described in a more specific manner.

Although partially duplicated with the entire actions described above, as shown in FIG. 6, the position information input device 1 according to the first exemplary embodiment first generates and outputs the positioning signal P by the signal generation/output module 11, and feeds the positioning signal P towards the output electrode 11a in step S101.

At the same time, in order to feed the positioning signal P to a specific input position (for example, 3a) within the information input area 3 of the back of the hand 2A part of one of the hands 2 holding the apparatus, a touch action is executed simultaneously to the output electrode 11a and the specific input position 3a by a finger of the other hand (the finger touch input unit 5A: see FIG. 3). As a result, the positioning signal P is electrically outputted from the specific input position 3a towards the receiving electrodes 4a, 4b, and 4c which are mounted by being abutted against the back of the hand 2A part (S101).

Then, in step S102, the positioning signal P fed to each of the input positions 3a to 3i from the above-described output electrode 11a via the finger touch input unit 5A is detected by the signal receiving unit 4 (each of the receiving electrodes 4a, 4b, 4c) as the electric signal transmitted via the body (the back of the hand 2A) of the operator (S102).

Further, in step S103, the input position specifying module 12 functions to refer to first accumulation data 13a saved in the database 13 in advance, relate it to the positions of the input area 3, specify which of the input positions is selected, and output it as the first input information specification data e for a specific input position (for example, the input position 3a) (S103).

Furthermore, in step S104, the corresponding symbol, data, or the functional content stored in advance to the database 13 by corresponding to the specified given input position is displayed (S104).

Next, the contents of the actions of each of the steps S101 to S104 will be described in a more specific manner.

In the first exemplary embodiment, as described above, the human body is treated as an electric conductor, and the exemplary embodiment is structured to measure the electric impedance property (actually the pure resistance) to use it for making an input to the apparatus.

As described above, the electric impedance Z of the human body actually includes the resistance component R and the capacitance component X, and the contact position can be specified since the transmission path length of the electric signal within the human body can be acquired by measuring the resistance component R. In the meantime, while direct currents may be used as electric signals, alternating currents are used in the first exemplary embodiment to measure the pure resistance component so as to specify the input position based on the pure resistance component since the electric resistance as well as the static capacitance is high in the human body.

Figure 7B:
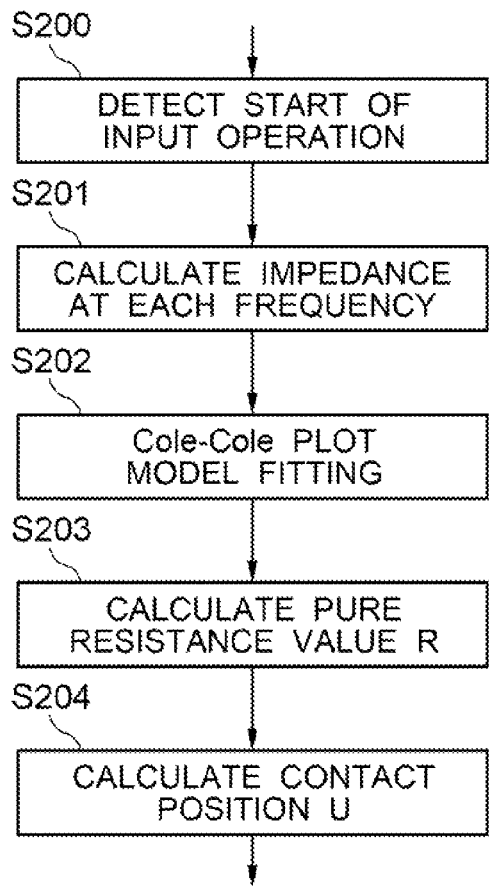

FIG. 7A and FIG. 7B show an example of the content of the AC signal generated and oscillated by the signal generation unit 11A of the signal generation/output module 11.

Figure 6:
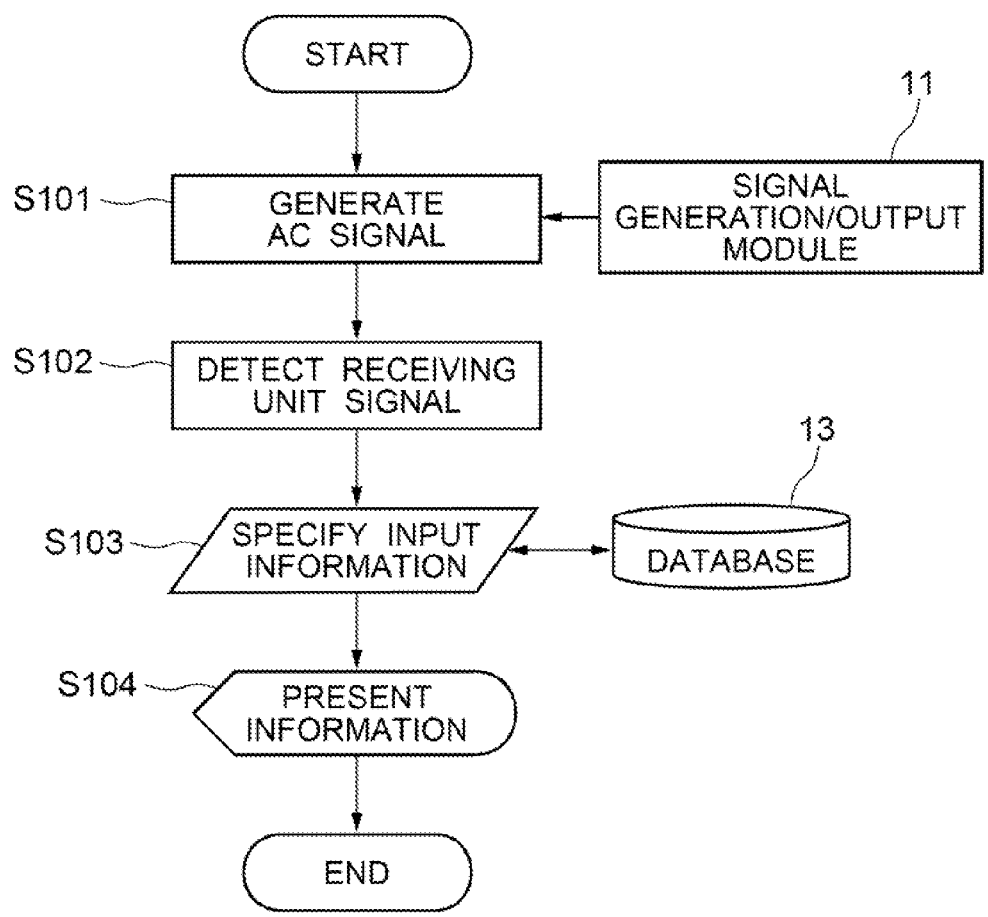
FIG. 6 is a flowchart showing an example of the entire operation of the first exemplary embodiment disclosed in FIG. 1.

First, in step S101 of FIG. 6 described above, the AC signal generated and oscillated by the signal generation unit 11A is a sine wave. In order to calculate the electric impedance at each frequency, as shown in FIG. 7A, the signal generation/output module 11 first generates an AC electric signal of a specific frequency in a prescribed time by being controlled by the main control unit 12C described above, and then changes the oscillation frequency in order by every prescribed time.

In step S102, the signals transmitted through the human body at the time of dispatch at each frequency are received at the receiving electrodes 4a, 4b, 4c. As described above, the input position specifying module 12 specifies the electric current value from the reception signals inputted via the signal receiving circuit 41, and acquires the voltage values of the reception signals by the signal generation/output module 11 described above.

FIG. 7B is a flowchart showing an example of the action executed by the input position specifying module 12.

Referring to FIG. 7B, first, start of an input operation is detected in step S200. In step S101, before generating a dispatch signal by the dispatch/generation module 11, a trigger of output start by the dispatch/generation module 11 is judged in step S200. The output electrode 11a as the first signal dispatch unit detects the start of an input operation by detecting the fact that the potential of the receiving electrode 4a approaches the output electrode 11a when the thumb of the operating hand with a specific potential touches the receiving electrode 4a that is the first signal receiving unit. Touching of a part of the terminal with the thumb of the operating side is a necessary action for making an electrically closed circuit, and there are also other following advantages.

The first advantage is stabilization of the contact state between the electrode part of the output electrode (the first signal dispatch unit) 11a as well as the receiving electrode (the first signal receiving unit) 4a and the skin. In a case where it is the arm type and is in contact with the body by being wrapped around the body as in the case of this exemplary embodiment, there is an excessive clamping pressure applied to the operator when the terminal is fastened for stabilizing the contact point. In that condition, it is uneasy to use the device. In the meantime, when the terminal is worn in a loosely fastened state, the contact state is unstable. Thus, electric values cannot be generated. In this respect, stabilizing the contact point by pressing down the output electrode (the first signal dispatch unit) 11a when executing the input operation provides such an advantage that more stable electric signals can be generated.

The second advantage is that no extra energy is consumed other than the operation time. In a case of a wristwatch type as in the case of this exemplary embodiment, the energy can be supplied only from the terminal. Thus, the capacitance of a charger depends on the terminal size, so that saving the energy is an important issue. In this respect, not to operate the output electrode (the first signal dispatch unit) 11a by the processing action of the signal generation/output module 11 as the dispatch/generation module other than in the input operations is effective for saving the energy.

The third advantage is that it is possible to separate an input operation from a simple contact with the body. If a simple contact to the input area 10 as a part of the body is judged as an input, an action irrelevant to an input, e.g., hand clapping, may be taken as an input, which may result in mis-operation of the apparatus. In this respect, to judge as an input operation only when there is a touch on the output electrode (the first signal dispatch unit) 11a is explicit for discriminating simple actions from the input operation, and it is easy for the operator to understand.

As described above, FIG. 7B shows an example of the detailed contents of step S103 shown in FIG. 6. Referring to FIG. 7B, in step S201 showing the details of step S103, the ammeter 15 and the voltmeter 14 are used to calculate the impedances ($Z_1$, $Z_2$, $Z_3$) at each frequency.

Here, human body cells and the electric property thereof will be described briefly. As an electric equivalent circuit of the human body cells, Hayden model will be used.

As shown in FIG. 8, the electric resistance powers of the human body cells are different inside and outside the cells, respectively, and those can be divided into an extracellular resistance 21 and an intracellular resistance 22. Further, there are a membrane resistance 23A and a membrane capacitance 23B in a cell membrane that is a boundary face between the outer part and the inner part of the cell. The membrane resistance 23A and the membrane capacitance 23B can be considered as an electric parallel circuit, and the intracellular resistance 22 can be considered as a serial circuit with respect to the cell membrane. Further, the external resistance 21 can be considered as a parallel circuit with respect to the internal resistance 22.

Figure 9A:
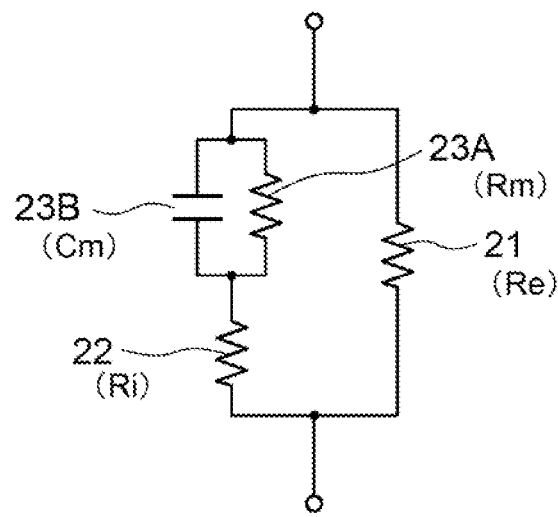
Figure 9B:
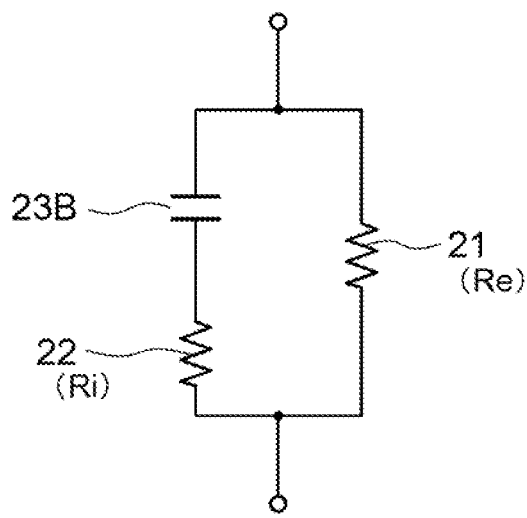

FIG. 9A and FIG. 9B show the electric parallel circuit of the human body cells. In FIG. 9A, the electric property of the human body cells shown in FIG. 8 is replaced with the electric equivalent circuit. Note here that it is defined that the external resistance 21 is $R_e$, the intracellular resistance 22 is $R_i$, the membrane resistance 23A is $R_m$ and the membrane capacitance 23B is $C_m$.

FIG. 9B is a more simplified version of the equivalent circuit shown in FIG. 9A. Since $R_m$ that is the membrane resistance 23A has an extremely high resistance value, the simplified equivalent circuit can be used.

FIG. 10 is a chart showing the electric impedances at each frequency. The electric impedances at each frequency in the electric equivalent circuit shown in FIG. 9B is a Cole-Cole plot with the lateral axis being R that is the resistance component and the longitudinal axis being X that is the negative capacitive component.

When the electric impedance Z is expressed as "Z=R+jX", the phase changes in the electric impedance X along the changes in the frequency can be expressed on an arc. Regarding an intersection point with respect to the real-value axis, the impedance Z crosses at a point with a large real-number axis component when the frequency is taken as "0". In the meantime, the impedance crosses at a point with a small real-number axis component when the frequency is considered infinite.

Specifically, the impedances Z at each frequency calculated in step S201 of FIG. 7B described above are plotted to perform model fitting on the arc. For the model fitting, a function of an arc with the smallest error between the model and the actually measured values are calculated by a least square method from the actually measured values.

Referring to FIG. 7B described above, in step S203 of FIG. 7B, the pure resistance value of the human body as the resistance component when the frequency is zero is calculated. The pure resistance value is calculated from the cross point with the real-value axis on the circle obtained in step S202.

Further, in step S204 of FIG. 7B, a specific input position as one of the input positions 3a to 3i on the input area 3 as the contact position is calculated based on the calculated pure resistance value of the human body.

Figure 11C:
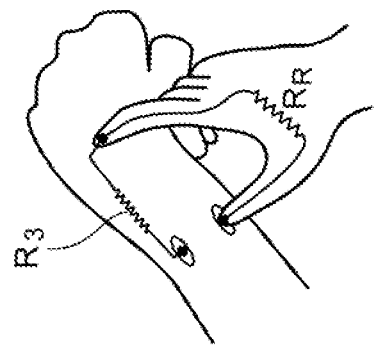
Figure 11B:
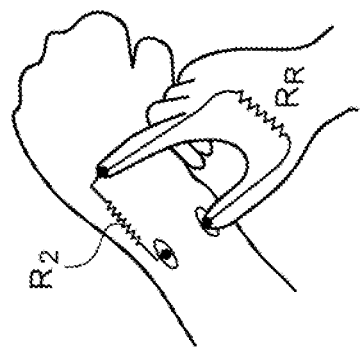
Figure 11A:
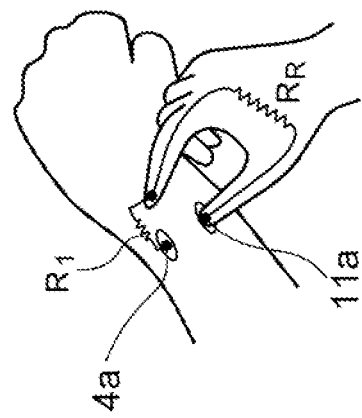

FIG. 11 shows examples of the relation between the contact positions and the electric resistance values. As shown in FIG. 11A, FIG. 11B, and FIG. 11C, when the input position on the input area 3 becomes farther from the receiving electrode 4a, for example, the resistance value becomes larger in proportion to the distance. Further, regarding the electric resistance value detected thereby, it is set as follows in FIG. 11A.

That is, in a case where an input operation to the signal receiving unit 4a is executed, assuming that the resistance value from the signal receiving unit 4a and the input position 3a (set hypothetically/may be any of the input positions 3a to 3i) touched by the forefinger is $R_1$, the resistance value from the tip of the forefinger that performs the input operation and the tip of the thumb that touches the output electrode 11a is $R_R$, and the total of the contact resistances at two contact points is $R_T$, the total resistance value $R_A$ can be expressed as "$R_A = R_1 + R_R + R_T$".

Similarly, $R_B$ can be expressed as "$R_B = R_2 + R_R + R_T$" in FIG. 11B, and $R_C$ can be expressed as "$R_C = R_3 + R_R + R_T$" in FIG. 11C.

Here, it is necessary to subtract $R_R$ as the resistance value of the forefinger of the input operation side and the contact resistance power $R_T$ for calculating the distance from the input position to the first signal receiving unit 3. Thus, "$R_R +$ $R_T$" as the contact resistance value when touching the receiving electrode 4a is recorded in advance in the database 13, and subtraction is done at last.

Figure 12:
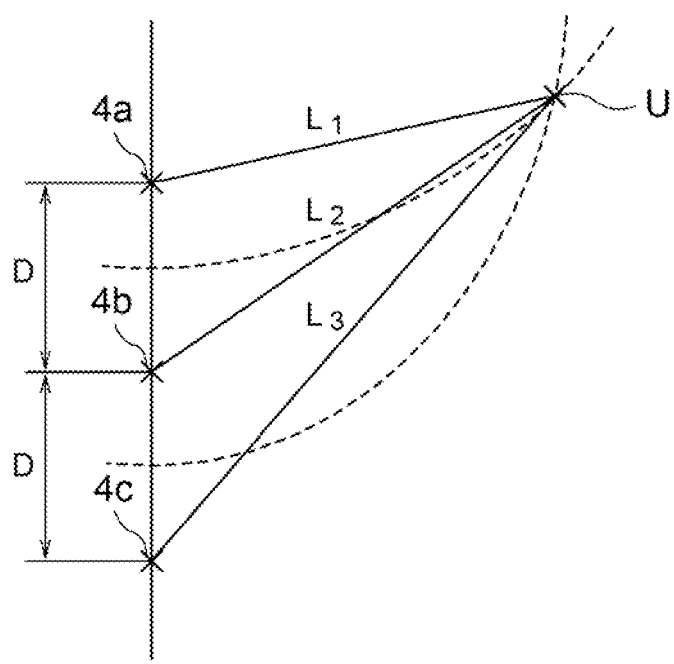
FIG. 12 is an explanatory chart showing an example of the relation between a contact position on the input area (on a plane) and position of the receiving electrodes for specifying the position according to the content disclosed in FIG. 1.

FIG. 12 is an explanatory chart showing a specific example of a contact position on a plane. As shown in FIG. 1 and FIG. 3, in the exemplary embodiment, the three receiving electrodes 4a, 4b, and 4c are arranged laterally in line towards the input area 3 at an equivalent interval with the distance D. Reference code U shows a position in the input area 3 touched by the forefinger shown in FIG. 3, e.g., "a".

Then, the above-described position input specifying module first calculates the impedances $Z_1$, $Z_2$, and $Z_3$ of the corresponding frequencies for each signal current from the signal voltage $E_S$ as well as the signal currents $I_{Sa}$, $I_{Sb}$, and $I_{Sc}$ based on the positioning signal S of the reception signals of different frequencies that are sequentially detected by the receiving electrodes 4a, 4b, and 4c, respectively.

Subsequently, the resistance values $R_{L1}$, $R_{L2}$, and $R_{L3}$ are specified based on the calculated impedances $Z_1$ to $Z_3$. These arithmetic operations are executed by the path resistance calculating unit 12A of the input position specifying module 12.

Next, the distances $L_1$, $L_2$, and $L_3$ corresponding to the resistance values $R_{L1}$, $R_{L2}$, and $R_{L3}$ are taken out from the database 13, and the distance to the contact position U that is the distance to the touch position "a" is calculated with respect to the distance D between the receiving electrodes 4a, 4b, and 4c. Thereby, the position information of "a" is externally outputted. This data processing is executed by the input position specifying unit 12B of the input position specifying module 12.

As shown in FIG. 1 and FIG. 3, while the input area 3 in the first exemplary embodiment is allotted to "a" to "wa" in Japanese required for inputting characters, the input area 3 may also be allotted to symbols such as "*" and "#", English letters such as "A" to "G", numbers "0" to "9", a clear key, a finalization key, and the like. Further, since the contact position can be specified, it is also possible to be utilized for specifying positions of mouse operations such as a touch pad. Furthermore, while three receiving electrodes 4a, 4b, and 4c of the signal detecting unit 4 as the signal receiving unit are disposed in a part to be in contact with the arm surface at the back face of the terminal main body 20 as the structure of the input unit 10, it is also possible to employ a structure in which two receiving electrodes are disposed, and a table of contact positions for the calculated resistance values $R_{L1}$, $R_{L2}$ are saved in a database in advance.

Further, while the exemplary embodiment is structured to detect the start of an input operation in step S200 described above based on the change in the potential from the output electrode 11a as the first signal dispatch unit to the receiving electrode 4a as the first signal receiving unit, it is also possible to employ a structure which includes a switch for starting to supply electricity mechanically by touching the receiving electrode 4a (the first signal dispatch unit).

(Making Program of Control Action)

Note here that the actions of each of the above-described structural components are all executed based on instructions of the main control unit 12C described above. Therefore, the contents of the actions in each of the above-described steps may be put into a program to have it executed by a computer that is provided to the main control unit 12C.

In this case, a signal detecting action, a path impedance calculating action, a path resistance value calculating action, and a position information output control operation, for example, can be put into programs to be executed by the computer as described below.

That is, a detection signal processing function which inputs the AC electric signal and specifies it as the positioning signal, when the AC electric signal P formed with a same voltage by taking a plurality of signals of different frequencies as a group, which is a specific positioning signal applied to one of a plurality of input positions disposed in a matrix form on the surface of the conductive object via the signal input transfer module 5 (5A) is detected as the positioning signal S at the other position on the conductive object, a path impedance calculating function which calculates each of the impedances Z of the propagation paths $L_1$, $L_2$, $L_3$ on the conductive object 2 where the detected positioning signal passes based on the electric current value of the reception signal and the applied voltage value of the same voltage, a path resistance value calculating function which calculates the pure resistance value (the path resistance value) R of the path based on the impedances $Z_1$, $Z_2$, $Z_3$ of the propagation paths of each frequency acquired by the arithmetic operation, and a position information output control function which takes out the input position corresponding to the calculated path resistance value R from the corresponding list stored in advance to the database as the path resistance value of each input position, and outputs the value to a prescribed information processing device 50 may be put into programs to be executed by the computer.

In this case, regarding the above-described path resistance value calculating function, it may be structured to perform an arithmetic operation to acquire the reactance component X and the pure resistance component R of the propagation path on the conductive object based on a plurality of functions of the path impedances $Z_1$, $Z_2$, and $Z_3$ established by each frequency and to specify the pure resistance component R as the electric resistance value, when calculating the pure resistance component R of the path propagated on the conductive object 2.

(Symbols and the Like of Input Area)

While the input area 3 in the first exemplary embodiment is allotted to "a" to "wa" in Japanese required for inputting characters, the input area 3 may also be allotted to symbols such as "*" and "#", English letters such as "A" to "G", numbers "0" to "9", a clear key, a finalization key, and the like.

Further, since the contact position can be specified, it is also possible to be utilized for specifying positions of mouse operations such as a touch pad.

Furthermore, while there is illustrated the case where three receiving electrodes 4a, 4b, and 4c are disposed in a part to be in contact with the arm surface at the back face of the terminal 1 as the structure of the input unit 10, it is also possible to employ a structure in which two receiving electrodes 4a and 4b are disposed, and a table of contact positions for the calculated resistance values $R_{L1}$, $R_{L2}$ are saved in a database 13 in advance.

The first exemplary embodiment is described by assuming the case where the plurality of input positions in a matrix form is placed on the back of the hand of the person and the resistance value of a part of the human body is measured. However, such case is simply presented as a way of example. For example, it is possible to employ a structure in which a column of input positions including a plurality of Japanese characters "a", "ka", "sa" is assumed in FIG. 1, and a resistance value between each of the assumed input positions and the receiving electrode is measured to use it as position specification information.

(Effects of First Exemplary Embodiment)

As described above, for inputting the position information of a plurality of each of the input positions 3a to 3i of the input area 3 set on the top face of the conductive object 2, the first exemplary embodiment according to the present invention is structured to: apply and input the positioning signals P having a plurality of signals of different frequencies keeping same-level voltages as a single group to each of the input positions under a same condition; receive the positioning signal P propagated via the conductive object by the plurality of receiving electrodes; calculate the resistance value of the propagation path of the positioning signal by the input position specifying module based on the change in the impedance acquired based on the difference in the frequencies; and specify the above-described input positions based thereupon.

Therefore, it is possible to provide the excellent position information input device, the position information input method, and the position information input program, which can achieve the followings. That is, the plurality of each of the input positions of the input area assumed on the conductive object can function as the information input positions only through assuming the input area 3. Therefore, even the back of a hand of a human body as a conductive object can be allotted as the input area for performing input operations without providing any electric wiring, for example. Thus, it is possible to have a small detecting unit on the apparatus (or no area specification) and a large display unit to be used. This makes it possible to secure the large input area anywhere as long as it is the conductive object.

The first exemplary embodiment is structured and functions in the manner described above. Thereby, when there is a contact with the human body that holds the terminal 1 for making an input, an electric signal is dispatched from the terminal 1 that is in contact with the human body and the electric signal transmitted inside the human body is further detected to measure the physical electric property. Thus, the input contact position (one of the input positions 3a to 3i) can be specified. Therefore, the input area 3 for performing input operations can be allotted to a part of the human body that makes contact with the terminal 1. This makes it possible to have a small detecting unit on the apparatus and a large display unit. Furthermore, it is possible to secure the large input area 3 allotted to the human body.

Further, the input area 3 in the exemplary embodiment is large, so that operations such as selection and finalization can be easily understood. Compared to the known case in which a plurality of functions are allotted to a single input area for reducing the input area 3 and each function is selected by the operation orders or combinations, each function can be allotted to the large input area 3. Therefore, it is easy to perform operations.

Further, another effect is that the input area 3 is large and the operations such as selections and finalizations can be done easily. Compared to the case of providing the input area on the apparatus and reducing the size thereof as in another related technique, a sufficiently large input area 3 can be secured. Therefore, positioning for input operations by the operator can be done easily, so that an effect of decreasing input mistakes and cutting the input time can be achieved.

Further, the first exemplary embodiment secures the large input area 3, so that it is suited for operations such as the handwriting character input. For example, compared to the case of loading a device that performs pointing or scroll operations by contacting the surface to each apparatus and reducing the size thereof, the first exemplary embodiment is capable of securing the large input area 3 for performing the input even though the detecting unit (receiving electrode) for detecting the input is small. Therefore, it is suited for operations with scroll actions, which requires a large operation area, and for operations which designate the input start position as an absolute position.

Furthermore, the first exemplary embodiment exhibits high input validating property, since it is possible to sense that there is an input operation being performed by feeling a touch to the body. This makes it possible to check which of the positions an input is made without looking at the operation part.

Furthermore, it requires no troublesome work of having a member for detecting positions wound to the body. The detecting unit for detecting inputs is only at a contact part between the apparatus and the human body, and it is excellent in the portability as well.

Each of those advantages can be implemented by providing only the input unit 10 in a part (the back of the hand, for example) of the human body that comes in contact with the apparatus.

Further, as an input action in the first exemplary embodiment according to the present invention, a contact to the input area allotted to the body is judged as an input only under a state of being in contact to a part of the terminal, and detection processing is performed. This provides following effects.

The first effect is to be able to stabilize the contact state between the skin and the electrode part that acquires the electric signal on the apparatus side. A pressure is applied to the contact part naturally by making a contact with a part of the terminal, so that the contact state becomes stable. Thereby, it is possible to acquire values more accurately.

The second effect is that no extra energy is consumed other than in the operation time. Since the input is detected only there is a contact with a part of the terminal, processing and actions for discriminating the operations are not performed other than in the time of the input operations. Therefore, it is advantageous for saving the energy.

The third effect is that it is possible to separate an input operation from a simple contact with the body. The input is detected only when there is a contact to a part of the terminal, so that it is possible to separate a contact to the input area allotted to the body made by an input operation of the operator from an action done as a person irrelevant to the input, e.g., simple hand clapping. Therefore, there is no issue of mis-operations of the apparatus.

The reason for enabling the three effects is based on the fact that a contact to the input area is taken as an input only in a state of being in contact with a part of the terminal as an input.

(Second Exemplary Embodiment)

Next, a second exemplary embodiment of the t invention will be described by referring to FIG. 13 and FIG. 14. It is a feature of the second exemplary embodiment that two output electrodes as the electrode pads 10 are provided. This is for reducing the influence of the contact resistance of the part to be in contact with the human body.

First, in the corresponding relation between the output electrode 11*a* and a plurality of receiving electrodes 4*a*, 4*b* according to the above-described first exemplary embodiment (FIG. 1), when the receiving electrode 3*a* detects an input position signal, signal currents $I_{sa}$ and $I_{sb}$ as detection data are outputted. Upon receiving the detection data (the signal currents $I_{sa}$ and $I_{sb}$), the input position specifying module 12 refers to the accumulation data 13*c* within the database 13 to estimate the input position.

Figure 13:
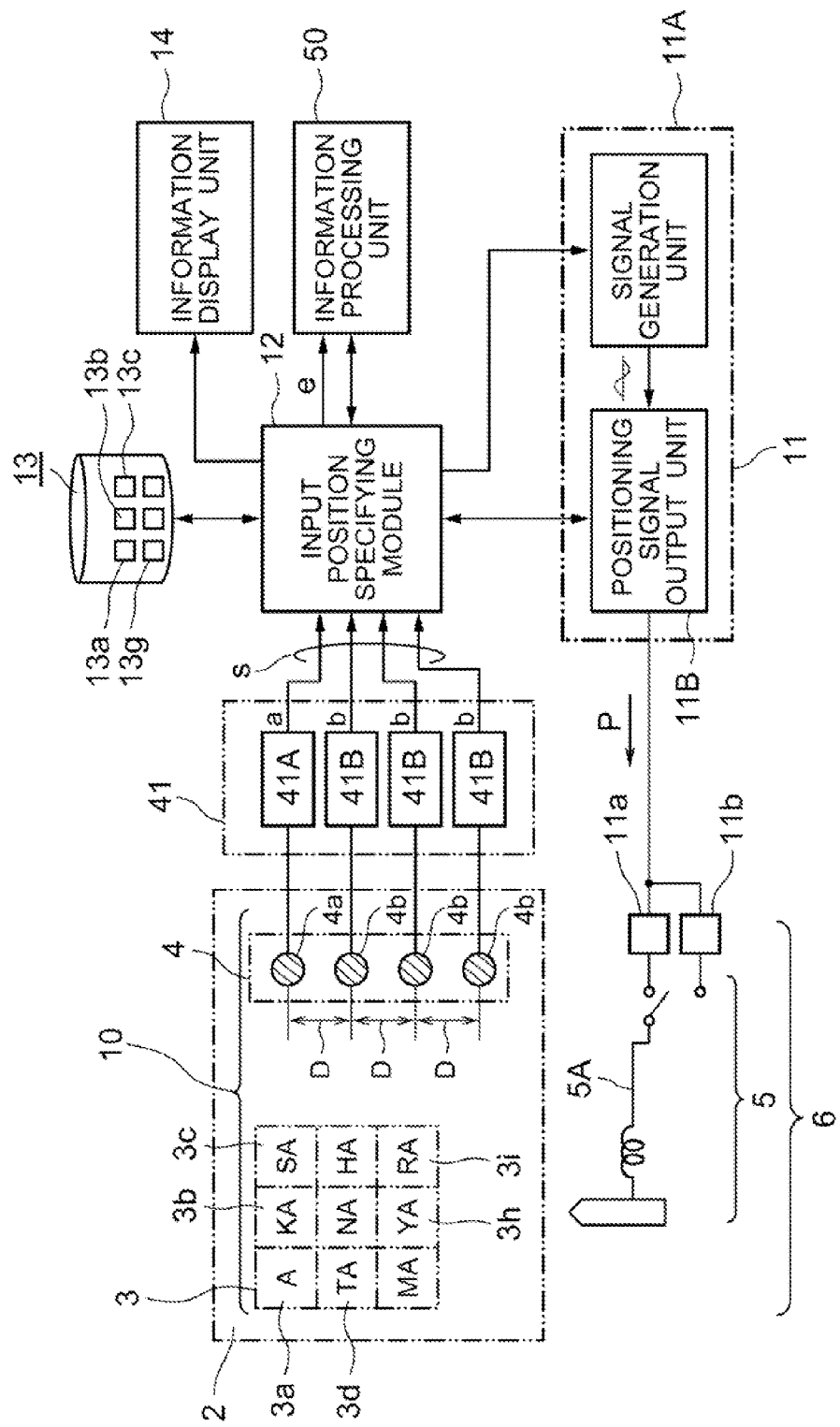
FIG. 13 is a block diagram showing the structure of a second exemplary embodiment of the invention.

In the meantime, in the second exemplary embodiment, as shown in FIG. 13, a plurality of output electrodes 11*a*, 11*b*, 11*b*, 11*b*, and a plurality of receiving electrodes 4*a*, 4*b*, 4*b*, 4*b* are used to detect input position signals. When the receiving electrodes 4*a*, 4*b*, 4*b*, and 4*b* receive an input, detection data f (signal currents $I_{Fa}$, $I_{Fb1}$, $I_{Fb2}$, and $I_{Fb3}$) containing no contact resistance of the part where the human body and the receiving electrodes 4*a*, 4*b*, 4*b*, 4*b* as the electrode pads 10 are in contact is outputted. Upon receiving the detection data f, the input position specifying module 12 refers to the accumulation data 13*g* within the database 13 to estimate the input position.

Figure 14A:
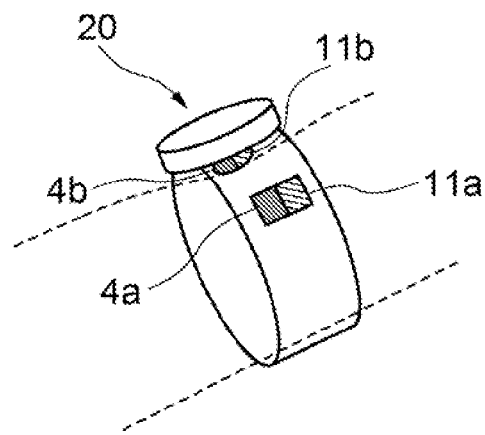
Figure 14B:
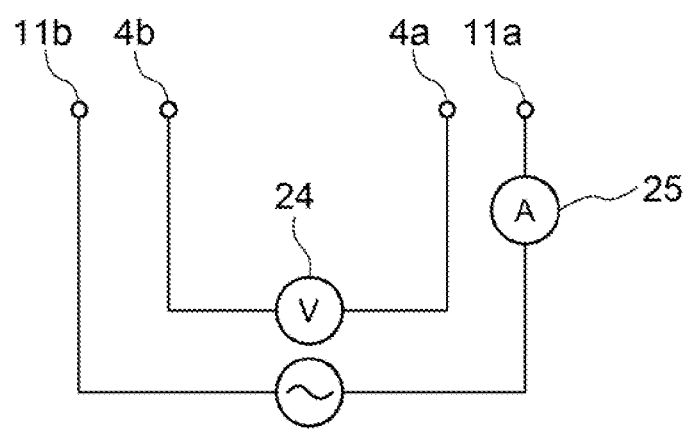

FIG. 14A and FIG. 14B are illustrations showing an example of the input unit. As shown in the drawings, there are four output electrodes 11*a*, 11*b*, 11*b*, 11*b* provided as the output electrode unit, and four receiving electrodes 4*a*, 4*b*, 4*b*, 4*b* are provided as the receiving electrodes.

Note here that a start of input operation is judged by applying electricity when the thumb of the operator touches the output electrode 11*a* as the second first signal dispatch unit on the dispatch side for the receiving electrode 4*a* as the second first signal receiving unit.

Then, at the part to be in contact with the operating thumb on the surface of the terminal 1, as shown in FIG. 14, one output electrode 11*a* and the receiving electrode 4*a* are arranged side by side. At a part to be in contact with the surface of the arm 2 on the back side of the terminal 1, another output electrode 11*b* and the receiving electrode 4*b* are disposed side by side.

Combinations of the other output electrodes 11*b* and the receiving electrodes 4*b* are provided at three points in the part to be in contact with the arm surface of the back side of the terminal 1 as in the case of the first exemplary embodiment described above (only one point is illustrated in FIG. 14A).

FIG. 14B is an electric circuit diagram of the input unit 10. In order to suppress the influence of the contact resistance of the part where the output electrodes as well as the receiving electrodes as the electrode pads and the human body are in contact, a 4-terminal method using four terminals is used to measure the electric impedance.

As shown in FIG. 14B, the AC signal generated by the signal generation/output module 11 is connected to the output electrode 11*a* and the other output electrode 11*b*, and the electric current amount is measured by the ammeter 25. Further, regarding the receiving electrode 4*a* disposed side by side with the output electrode 11*a* and the other receiving electrode 4*b* disposed side by side with the other output electrode 11*b*, the voltages thereof are measured by the voltmeter 24 inside the terminal 1.

Therefore, while the electric resistance values in FIG. 11 are shown by including the contact resistance power $R_T$ by the first input information specifying module 5 in step 204 with the first exemplary embodiment described above, the contact resistance power $R_T$ can be measured in small values with the second exemplary embodiment. Thus, the measurement error can be suppressed.

Other structures and operational effects thereof are the same as those of the first exemplary embodiment described above.

(Third Exemplary Embodiment)

Next, a third exemplary embodiment of the invention will be described by referring to FIG. 15.

The third exemplary embodiment is an embodiment that is effective for a case where it is difficult to secure a large detecting unit for detecting inputs on a same plane as a display unit because of an increased size in the screens of displays.

Figure 15:
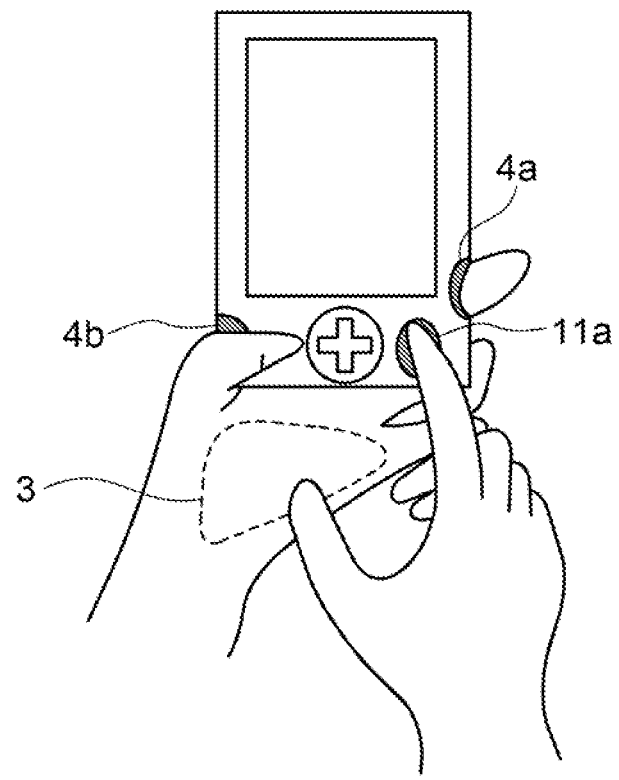
FIG. 15 is an explanatory illustration showing a schematic structure of a third exemplary embodiment of the invention and the use state thereof.

FIG. 15 is an illustration showing a state of an input operation. As shown in FIG. 15, in a part of a human body such as a fingertip on a side holding the terminal 1, one and the other receiving electrodes 4*a*, 4*b* disposed on the side face and back face of the terminal 1 and the output electrode 11*a* disposed at a position to be in contact with a forefinger of an operation side provided on the surface of the terminal 1 are placed. The input area 3 is structured to be set in a palm of the hand holding the terminal 1, and to execute input operations in the input area 3.

Other structures and operational effects thereof are the same as those of the first exemplary embodiment described above.

Therefore, the third exemplary embodiment makes it possible to add only the input part without changing the shape of the portable type terminal.

While the present invention has been described by referring to the embodiments (and examples), the present invention is not limited only to those embodiments (and examples) described above. Various kinds of modifications that occur to those skilled in the art can be applied to the structures and details of the present invention within the scope of the present invention.

INDUSTRIAL APPLICABILITY

The position information input device, the position information input method, and the position information input processing program according to the present invention can be applied in common to information processing apparatuses of various fields as input units of small-type information processing apparatuses, so that the versatility of use is great.

REFERENCE NUMERALS

1 Position information input device
2 Conductive object (back of hand of human body)
3 Input area (information input area)
3a, 3b, 3c, 3d Input position
4 Signal detecting unit
4a, 4b, 4c Receiving electrode
5 Signal input transfer module
5A Touch member
5B Finger touch input unit
6 Position signal input module
11 Signal generation/output module
11A Signal generation unit
11a Output electrode
11B Positioning signal output unit
12 Input position specifying module
12A Path resistance calculating unit
12B Input position specifying unit
12C Main control unit
13 Database
14 Information display unit
P Positioning signal (output side)
S Positioning signal (reception side)
a, b, c Reception signal
e Input position information
R Pure resistance

The invention claimed is:

1. A position information input device being a terminal, comprising:
an input unit formed with a single or a plurality of signal transmitting units for dispatching an electric signal in response to one part of a body that holds the terminal directly touching another part of the body for making an input and a plurality of signal receiving units for detecting the electric signal and outputting detection data;
a dispatch/generation module which generates the electric signal for the signal transmitting unit(s), outputs the generated signal as dispatch data, and outputs output chronic timing thereof and a state of the generated signal as generation data; and
an input information specifying module which specifies a contact position by referring to the detection data, the generation data, and accumulation data in a database set in advance, and outputs the position as input information specification data, wherein
the input information specifying module calculates electric impedance properties from electric current values and voltage values as the detection data based on timings showing each frequency as the generation data, calculates an electric impedance as a target based on physical electric properties of at least one of bones, muscles, tendons, joints, skin, and blood of the body by referring to the accumulation data of the database set in advance, and specifies the contact position from the electric impedance.

2. The position information input device as claimed in claim 1, wherein:
the signal transmitting unit(s) and the signal receiving units are disposed to be in contact with a part of the body such as a hand that holds the terminal, a fingertip, and a base of the finger; and
the signal receiving units detect the electric current values and the voltage values of the electric signal dispatched from the signal transmitting unit(s) based on the physical electric properties of at least one of the bone structures, the muscles, the tendons, the joints, and the skin of the body.

3. The position information input device as claimed in claim 1, wherein
the input unit includes conductive electrode pads at a part to be in contact with the body as the signal transmitting unit(s) and the signal receiving units, and a casing made with an insulator for blocking electrical connections in other parts.

4. The position information input device as claimed in claim 1, wherein
the casing of the input unit is in a wristwatch shape; and
the signal transmitting unit of the input unit is disposed on a surface of the casing, and three signal receiving units described above of the input unit are disposed on a back face side of the casing.

5. The position information input device as claimed in claim 1, wherein:
the casing of the input unit is in a wristwatch shape; and
the signal transmitting units and the signal receiving units are disposed at positions to be in contact with the body on a surface of a terminal of the casing, and the signal transmitting units and the signal receiving units are disposed at the positions to be in contact with the body at three points on a back face side of the terminal of the casing.

6. The position information input device as claimed in claim 1, wherein:
the casing of the input unit is in a wristwatch shape, and the signal transmitting unit is disposed on a surface of the casing; and
two signal receiving units described above are disposed on a back face side of the casing.

7. The position information input device as claimed in claim 1, wherein
the dispatch/generation module generates the electric signals to be AC currents as the electric signals dispatched from the signal transmitting units, and outputs the electric signals in order by a specific time unit from a lower frequency to a higher frequency.

8. The position information input device as claimed in claim 1, wherein the input information specifying module calculates model fitting to the impedance properties by an electric equivalent circuit based on cells of the body in particular in order to specify the contact position from the electric impedance, and calculates an electric pure resistance power of the body to specify the contact position.

9. The position information input device as claimed in claim 1, wherein
the database records the electric resistance power of the body that performs input operations and a contact resistance power at the contact part as the accumulation data.

10. The position information input device as claimed in claim 1, wherein
the database records the electric resistance power of the body that performs input operations and a contact resistance power at the contact part as the accumulation data, and further records a relation between the electric pure resistance power of the body and length of the body.

11. A position information input method for inputting position information to a terminal, comprising:
a dispatch/generation step which generates an electric signal, outputs the generated signal as dispatch data, and outputs output chronic timing thereof and a state of the generated signal as generation data;
a signal transmitting step for dispatching the electric signal in response to a part of a body that holds a terminal contacting another part of the body for making an input;
a signal receiving step for detecting the electric signal and outputting detection data; and
an input information specifying step which specifies a contact position by referring to the detection data, the generation data, and accumulation data in a database set in advance, and outputs the position as input information specification data, wherein
the input information specifying step calculates electric impedance properties from electric current values and voltage values as the detection data based on timings showing each frequency as the generation data, calculates an electric impedance as a target based on physical electric properties of at least one of bones, muscles, tendons, joints, skin, and blood of the body by referring to the accumulation data of the database set in advance, and specifies the contact position from the electric impedance.

12. The position information input method as claimed in claim 11, wherein
the detection data detected in the signal receiving step is data generated based on the electric current values and the voltage values.

13. The position information input method as claimed in claim 11, wherein
the dispatch/generation step generates the electric signals to be AC currents as the electric signals dispatched in the signal transmitting step, and outputs the electric signals in order by a specific time unit from a lower frequency to a higher frequency.

14. The position information input method as claimed in claim 11, wherein
the input information specifying step calculates model fitting to the impedance properties by an electric equivalent circuit based on cells of the body in particular in order to specify the contact position from the electric impedance, and calculates an electric pure resistance power of the body to specify the contact position.

15. The position information input method as claimed in claim 11, wherein
the accumulation data in the database that is referred in the input information specifying step is data in which the electric resistance power of the body that performs input operations and a contact resistance power at the contact part are recorded.

16. The position information input method as claimed in claim 11, wherein
the accumulation data in the database that is referred in the input information specifying step is data in which the electric resistance power of the body that performs input operations and a contact resistance power at the contact part are recorded, and a relation between the electric pure resistance power of the body and length of the body is further recorded.

17. A position information input device, comprising:
an input unit formed with a single or a plurality of signal transmitting means for dispatching an electric signal in response to one part of a body that holds the terminal directly touching another part of the body for making an input and a plurality of signal receiving means for detecting the electric signal and outputting detection data;
dispatch/generation means for generating the electric signal for the signal transmitting unit(s), outputting the generated signal as dispatch data, and outputting output chronic timing thereof and a state of the generated signal as generation data; and
input information specifying means for specifying a contact position by referring to the detection data, the generation data, and accumulation data in a database set in advance, and outputting the position as input information specification data, wherein
the input information specifying means calculates electric impedance properties from electric current values and voltage values as the detection data based on timings showing each frequency as the generation data, calculates an electric impedance as a target based on physical electric properties of at least one of bones, muscles, tendons, joints, skin, and blood of the body by referring to the accumulation data of the database set in advance, and specifies the contact position from the electric impedance.

* * * * *